(No Model.) 2 Sheets—Sheet 1.

D. WOLF.
DINNER PAIL.

No. 261,891. Patented Aug. 1, 1882.

WITNESSES.
S. E. Stevens.
P. E. Stevens.

INVENTOR.
David Wolf.
PER. W. X. Stevens.
ATTY.

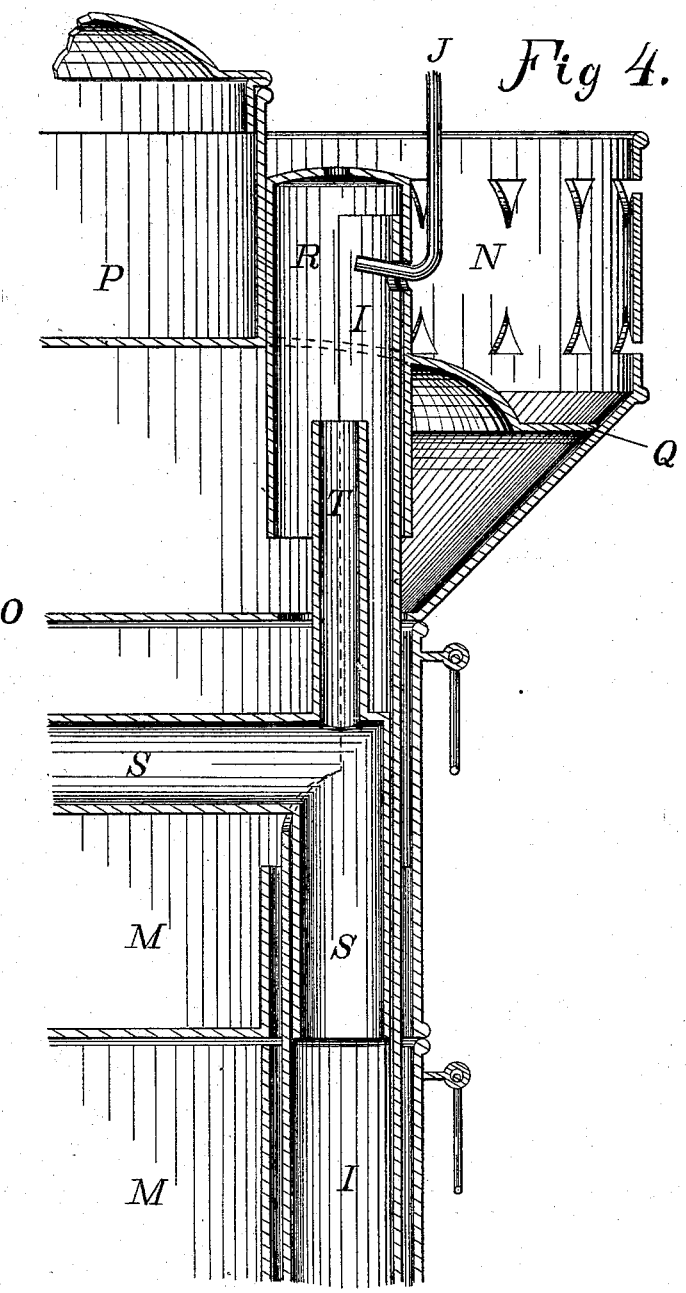

United States Patent Office.

DAVID WOLF, OF LOUISVILLE, KENTUCKY.

DINNER-PAIL.

SPECIFICATION forming part of Letters Patent No. 261,891, dated August 1, 1882.

Application filed May 29, 1882. (No model.)

*To all whom it may concern:*

Be it known that I, DAVID WOLF, a citizen of the United States, residing at Louisville, in the county of Jefferson and State of Kentucky, have invented certain new and useful Improvements in Dinner-Pails; and I do hereby declare the following to be a full, clear, and exact description of the invention, such as will enable others skilled in the art to which it appertains to make and use the same.

My invention relates to self-heating dinner-pails, and has for its object to provide means whereby several kinds of food may be carried in separate compartments forming one pail, and the food warmed at little cost in places where it would be impracticable to have a fire for that purpose.

To this end my invention consists in a peculiar heating apparatus carrying dishes of peculiar construction and arrangement, as hereinafter more fully described, reference being had to the accompanying drawings, in which—

Figure 1:
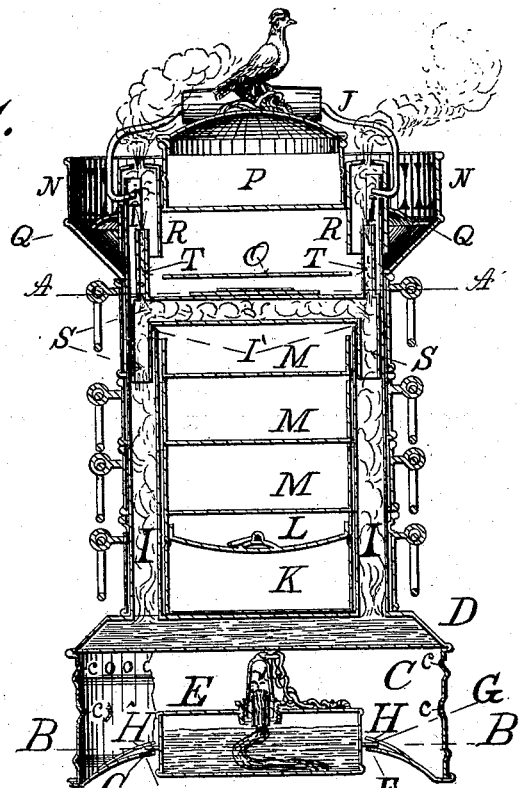
Figure 2:
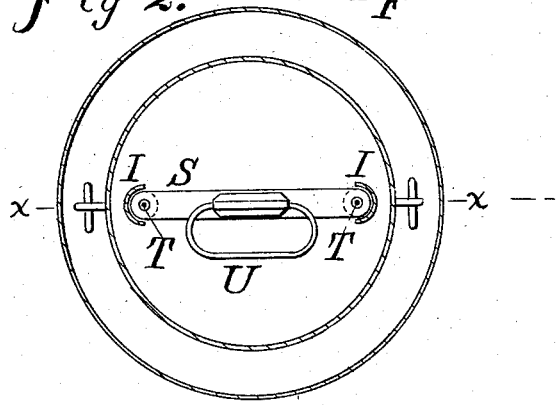
Figure 3:
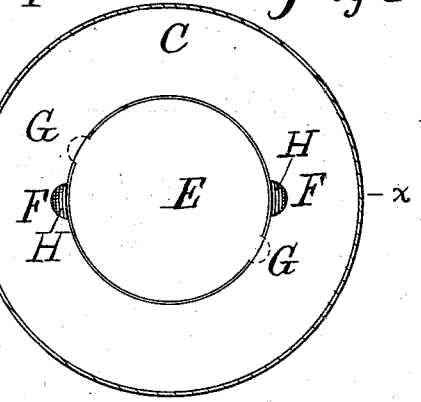

Figure 1 is a longitudinal vertical section of my invention, part in elevation, on line $x$, Figs. 2 and 3. Fig. 2 is a horizontal section at A of Fig. 1, and Fig. 3 is a horizontal section at B. Fig. 4, Plate 2, is an enlarged view of the upper right-hand portion of Fig. 1.

C represents the body of the heater, having a close compartment, D, used to contain water as a heating medium to convey heat from the lamp below it to the dishes containing food and drink above it.

The lamp E is put into the heater C through a hole in its concave bottom, and is retained in position by means of projecting ears G, which enter the bottom of the heater through notches F, and are then turned by turning the lamp on its vertical axis till the ears G rest on the upper face of the heater-bottom.

The lamp is prevented from being pushed too far in and the ears are retained in position by a collar, H, secured at its circumference to the upper face of the heater-bottom and raised at its inner edge from the bottom to leave an annular recess into which the ears G may enter.

The compartment D is provided with two vertical tubes, I I, through which the water is introduced and steam escapes.

J is the bail or handle hooking its two ends into holes near the top of the pipes I.

Thus the heater C D, the tubes I, and the bail form the frame, on which are carried the coffee-boiler K, having its own lid L, the food-dishes M, each of which is covered by a dish above it, the balustrade N, which is more for ornament than service, though it has a bottom, O, and the top compartment, P, provided with a flange, Q, which rests on the balustrade, and with caps R to cover the top of the steam-pipes I, and with a lid, which may be ornamented in any manner, as with the image of a bird shown.

The bail J passes through the caps R to enter the tubes I, thus holding all the parts together, except the top lid.

To take the pail apart the ends of the bail must be sprung out of their holes in the pipes I, for said pipes pass through each compartment or dish forming the pail.

The dishes are made water-tight at the pipe-holes by means of vertical walls or partitions raised from the bottom of each dish loosely around the pipes.

S is a cross-pipe connecting between the steam-pipes I, into which its ends depend vertically, fitting neatly, to furnish more heating-surface and to circulate the heat. From the top of this pipe S two small pipes, T, serve as outlets to the steam. To admit the cross-pipe S the pipes I are cut half away vertically down to I', as shown in Fig. 2. This side cut in the pipes I allows some steam to escape downward from the caps R into the chamber O, by which means food in that compartment may be steamed.

U is a wire handle by which to remove the pipe S when hot, in order to get at the dishes below.

Any number of dishes or compartments may be united to form my dinner-pail.

Its principal advantages are, first, it serves to carry a variety of food in separate dishes, which may be used to eat from, each article being neatly kept from contact with the rest; second, it may be used in wind or rain or in shops where shavings or other combustibles would render a fire impracticable to serve a warm dinner; and, third, it is designed to produce the greatest result from a small amount of fuel, and is always ready for use, thus being efficient and economical.

What I claim, and wish to secure by Letters Patent, is—

1. The combination, in a dinner-pail, of the lamp E, provided with two or more ears, G, with the centrally-perforated bottom of the heating-chamber C, provided with notches F, through which the ears G pass, and further provided with the retaining-collar H, as shown and described.

2. The combination of the lamp E, chambers C D, steam-pipes I, and circulating-pipe S, as described.

3. The combination of the heating apparatus E C D I, dishes K M, and bail J, hooking into the pipes I, as described.

4. The combination of the heating apparatus E C D I, dishes K M, bail J, and top dish, P R, secured to the pipes I by the bail J, as shown and described.

In testimony whereof I affix my signature in presence of two witnesses.

DAVID WOLF.

Witnesses:
W. A. STRATTON,
JAMES T. A. BAKER.